United States Patent [19]

Shomo, III

[11] 3,943,447
[45] Mar. 9, 1976

[54] METHOD AND APPARATUS FOR BI-DIRECTIONAL COMMUNICATION VIA EXISTING CATV SYSTEM

[75] Inventor: Glen Keller Shomo, III, Harrisonburg, Va.

[73] Assignee: Comsonics, Inc., Harrisonburg, Va.

[22] Filed: Oct. 8, 1974

[21] Appl. No.: 513,023

Related U.S. Application Data

[63] Continuation-in-part of Ser. No. 405,210, Oct. 10, 1973, abandoned.

[52] U.S. Cl. ........... 325/308; 325/37; 325/309; 178/DIG. 13
[51] Int. Cl.² ........................................... H04B 3/56
[58] Field of Search ......... 325/31, 51, 308, 309, 53, 325/37; 178/DIG. 13, 63 A, 70 R; 179/170 J, 2.5 B; 340/310; 307/2; 330/22

[56] References Cited
UNITED STATES PATENTS

| | | | |
|---|---|---|---|
| 3,048,780 | 8/1962 | Diambra et al. | 325/31 |
| 3,064,195 | 11/1962 | Freen | 325/308 |
| 3,105,125 | 9/1963 | Kassig | 179/170 J |
| 3,435,358 | 3/1969 | Rheinfelder | 325/308 |
| 3,619,783 | 11/1971 | Ritter | 325/31 |
| 3,665,311 | 5/1972 | Gargini | 325/308 |
| 3,671,885 | 6/1972 | Pennypacker | 325/308 |
| 3,686,573 | 8/1972 | McVoy | 325/308 |

*Primary Examiner*—Robert L. Griffin
*Assistant Examiner*—Jin F. Ng
*Attorney, Agent, or Firm*—Sughrue, Rothwell, Mion, Zinn & Macpeak

[57] ABSTRACT

Existing CATV coaxial cable systems are found to present a transparent window, in both the upstream and downstream directions, to communications signals over a frequency band from 10–300KHz, whereby such signals follow the path of the 60Hz power signal throughout the system. Signals in this band do not interfere with the high frequency TV signals being transmitted, and are not subject to interference by such TV signals. This discovery is thus utilized to implement bi-directional communications between any two or more points linked by such a CATV system without requiring any substantial modifications or additions to the existing system components.

A specific application utilizes such a communications link to remotely control non-duplication switching in the head or antenna end of a CATV system.

10 Claims, 6 Drawing Figures

METHOD AND APPARATUS FOR BI-DIRECTIONAL COMMUNICATION VIA EXISTING CATV SYSTEM

This application is a continuation-in-part of patent application Ser. No. 405,210, filed Oct. 10, 1973, now abandoned.

BACKGROUND OF THE INVENTION

1. Field of the Invention

This invention relates to a method and apparatus for effecting bi-directional communication within a given frequency band over an existing CATV coaxial cable system linking two or more remote points or stations.

2. Description of the Prior Art

With the advent in recent years of Community Antenna Television Systems, extensive and costly cable networks have been installed in many communities to link a central TV signal source, such as a mountain top antenna, to a plurality of remote subscribers. Once these cable networks are installed it is naturally tempting and desirable to utilize their signal carrying capacity to effect other forms of communication between the linked points or stations.

The presently used methods of providing such ancillary, bi-directional communications employ a radio frequency band of 5 - 32.5 MHz for upstream transmissions and the normal television carrier band of 50 - 300MHz for downstream transmissions. To enable such upstream carriage from a subscriber's home, for example, to a remotely located control center, additional equipment must be installed in the existing CATV system. Each downstream amplifier in the system must be provided with a diplexing filter to separate the 5 - 32.5MHz band from the 50 - 300MHz band, an upstream amplifier to compensate for the attenuation to the signal in the 5 - 32.5MHz band, and a combiner to rejoin the two bands back onto the same cable. In a similar manner, filters must be provided at each bridging amplifier to route the 5 - 32.5MHz band from the off-trunk splitter, around the bridging amplifier, and into the upstream amplifier. These necessary modifications are both costly and troublesome, and thus represent a considerable drawback when using an existing CATV system for ancillary, bidirectional communications.

SUMMARY OF THE INVENTION

According to the present invention, it has been discovered that existing CATV systems present a transparent window, in both the upstream and downstream directions, to communications signals over a frequency band from 10 - 300KHz, whereby such signals follow the path of the 60Hz power signal throughout the system. Signals in this band do not interfere with the high frequency TV signals being transmitted and are not subject to interference by such TV signals. This discovery is thus utilized to implement bi-directional communications between any two or more points linked by such a CATV system without requiring any substantial modifications or additions to the existing system components.

Signal coupling into and out of the CATV cable is conveniently made through existing power inserters installed at various points throughout the system to couple in the necessary 60Hz power supplies, although other means of coupling the communications signals are certainly possible.

The active components in a CATV system includes power coupling switches whereby the 60Hz power supply may be taken from the input side or the output side, and also passed on, either upstream or downstream, to the next active component. When an active component lies at the end of a powering run, a one microfarad capacitor is therefore coupled across the 60Hz lines, as explained in greater detail below, in order to continue the otherwise broken path from the 10 - 300KHz communications signals. The power coupling switch in the adjacent end component is then set to the THRU position to eliminate any "dead" 60Hz cable, thereby completing the communications signal path.

In a specific application of the instant invention a communications link is provided to remotely control a non-duplication switching in the head or antenna end of CATV system. Commercially available non-duplication switchers are programmable switches whose function is to prevent the duplication of local or priority channel video on the CATV system by another channel carrying the same program. They are time controlled switches, and are typically set or programmed each week by a technician with the program schedules of the various stations received by the CATV system for the next week in hand. A typical non-duplication switcher is the Jerrold Program Commander Model PC-6 controlling the Jerrol dmodel IF switcher. Since these non-duplication switchers are usually located at the antenna site, which is often in a remote area accessable only by very poor raods, the prior art procedure of setting them on-site each week entails substantial cost and inconvenience in terms of labor expenses and vehicle wear. According to the present invention the necessary programming and associated switching can efficiently and conveniently be done remotely, on a dialy basis if necessary, by simply transmitting the control signals upstream to the head end site over the indicated frequency band. A specific apparatus to implement such remotely controlled non-duplication switching is disclosed, which includes relay controlled tone generators to provide the necessary control signals in the communications band from 10 - 300KHz, and decoders at the receiver end responsive to the frequencies developed by the tone generators.

DESCRIPTION OF THE PREFERRED EMBODIMENT

Figure 1:
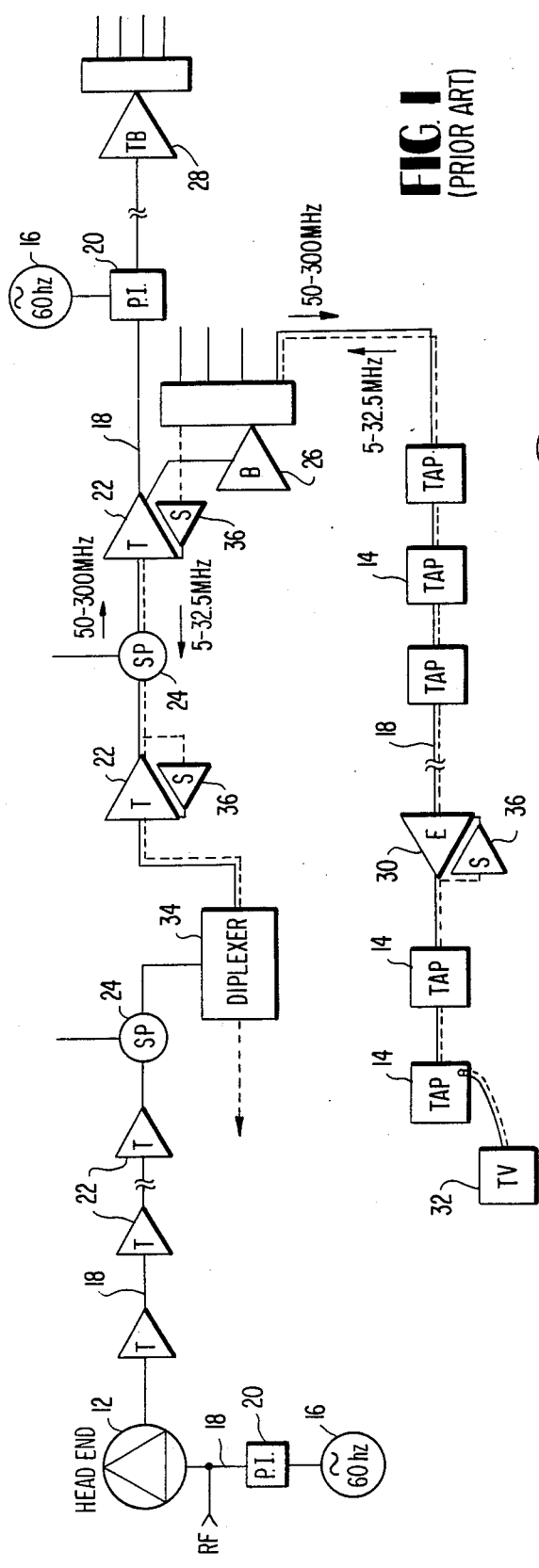
FIG. 1 shows a block diagram of the major components of a typical CATV system including the additional equipment needed to implement upstream communications according to the prior art.
Figure 2:
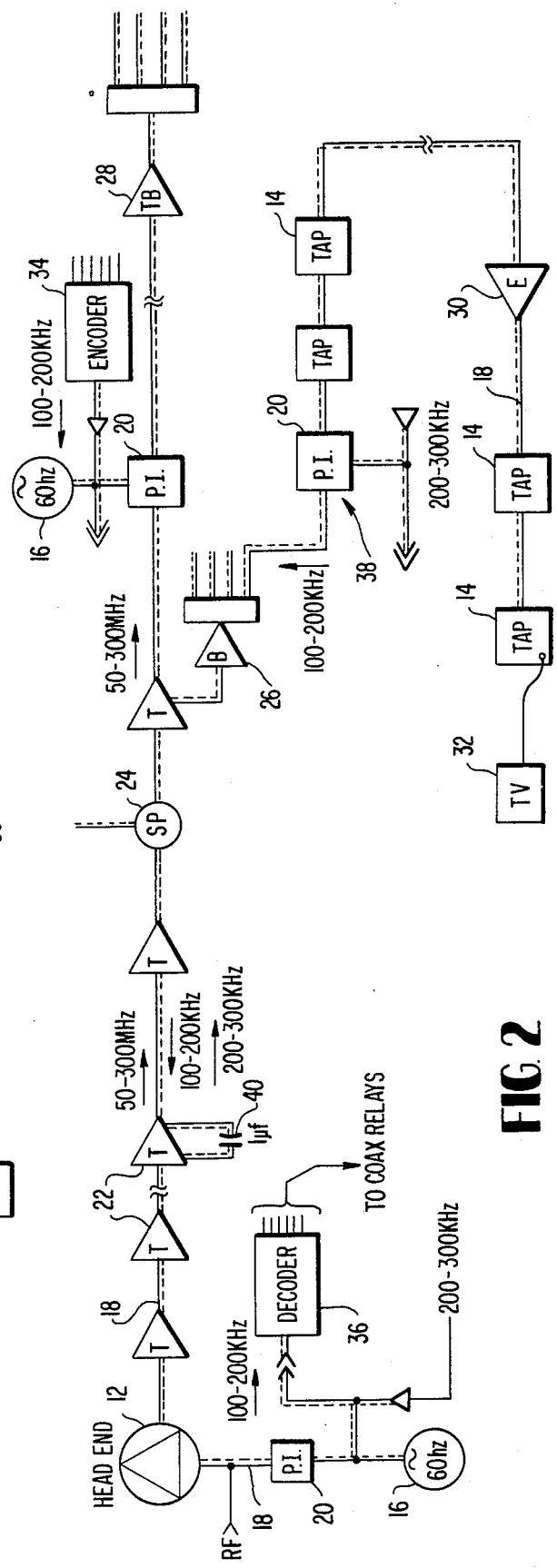
FIG. 2 shows a block diagram of the CATV system of FIG. 1 but incorporating an ancillary communications system according to the present invention.

Referring now to FIGS. 1 and 2 of the drawings, wherein the same reference numerals are used to designate like structural elements, a typical CATV coaxial cable system includes a head end or antenna site 12 feeding received, amplified, and possibly carrier switches r.f. signals to a plurality of subscriber taps 14 downstream. The essential system components include 60Hz power supply sources 16 coupled to the coaxial cable 18 through power inserters 20, trunk amplifiers 22, splitters 24 for branching out the cable network in pyramid fashion, bridger amplifiers 26, terminating bridger amplifiers 28, and extender amplifiers 30. A detailed description of the structure and operation of these components will not be presented since same form no part of the present invention, and is well known in the art. Suitable, commercially available examples of such components are listed, in the interests of completeness, as follows:

| FIGS. 1 and 2 | |
|---|---|
| Power Inserter 20 | C-COR Model (PS-1A) |
| Splitter 24 | C-COR Model (SM-2) |
| Cable 18 | ComScope (AL-75) 75 ohm coaxial |
| Terminating Bridger Amplifier 28 | AEL Communications Corp. Model (M4TB) |
| FIG. 1 only | |
| Trunk/Sub-band Amplifiers 22, 36 | AEL Model (M4R) |
| Trunk/Sub-band/ Bridger Amplifiers 22, 26, 36 | AEL Model (M4BR) |
| Extender/Sub-band Amplifiers 30, 36 | AEL Model (M5ER) |
| FIG. 2 only | |
| Trunk Amplifier 22 | AEL Model (M4) |
| Trunk/Bridger Amplifiers 22, 26 | AEL Model (M4B) |
| Extender Amplifier 30 | AEL Model (M5E) |

In the prior art ancillary communications system shown in FIG. 1, downstream signals are transmitted over a 50 – 300MHz band, which is compatible with the CATV system since this is the band occupied by the carriers in the VHF channels. Upstream signals, for example from a subscriber outlet 32, are transmitted over a 5 – 32.5MHz band along a path shown in broken line form. As may be seen, additional equipment must be installed to implement the upstream transmission in the form of a diplexing filter 34 to separate the 5 – 32.5MHz band from the 50 – 300MHz band, sub-band amplifiers 36 to compensate for attenuation losses to the upstream signal, and combiners to rejoin the two bands back onto the cable 18. All of these additional components have not been shown in the interest of simplicity, and it will be assumed that each sub-band amplifier also incorporates a diplexing filter at its input and a combiner at its output.

In the ancillary communications system of the present invention shown in FIG. 2, use is made of the discovery that signals in the 10 – 300KHz band see a transparent window and inherently follow the 60Hz power supply circuit in a CATV coaxial cable system in both the upstream and downstream directions. Signals in this band thus bypass the active components in the CATV system and do not in any way interfere with the r.f. signals being transmitted. The particular embodiment illustrated arbitrarily uses a lower portion of the total available band, from 100 – 200KHz, for upstream transmissions and an upper portion of the band, from 200 – 300KHz, for downstream transmissions, as shown by the directional arrows in FIG. 2. The communications signals propagate in all directions over the power supply path, as indicated by the broken line adjacent the cable 18. The small triangular arrowheads indicate exemplary communications signal inputs, while the chevron symbols designate outputs.

Although these communications signals may be transmitted between any two points or stations linked by the cable 18, FIG. 2 broadly shows an installation whereby signals originating at an encoder 34 may be transmitted upstream to a decoder 36 at the remote head end site to control the coaxial relays of a non-duplication switcher. The encoder 34 and decoder 36 are conveniently coupled into the cable system through 60Hz power inserters 20. If no 60Hz source is coupled to the system at a location where a communications signal connection is desired, a separate power inserter may be easily installed for this purpose as generally indicated at 38. It will be noted that a 1.0 μf capacitor 40 is coupled across the third trunk amplifier 22 from the head end 12. This amplifier is assumed to be the last one in a 60Hz powering run, and the details of the capacitor connection will be more fully described below with reference to FIG. 5.

It is not known with certainty why existing CATV systems, whose specifications are well standardized by both industry and the Federal Communications Commission, present this transparent window to communications signals in the 10 – 300KHz band, and indeed a detailed analysis would be extremely difficult since the circuit parameters associated with any high frequency transmission line system are many and complex. No such analysis will be attempted herein since same is not necessary for an understanding or an implementation of the present invention.

Figure 3:
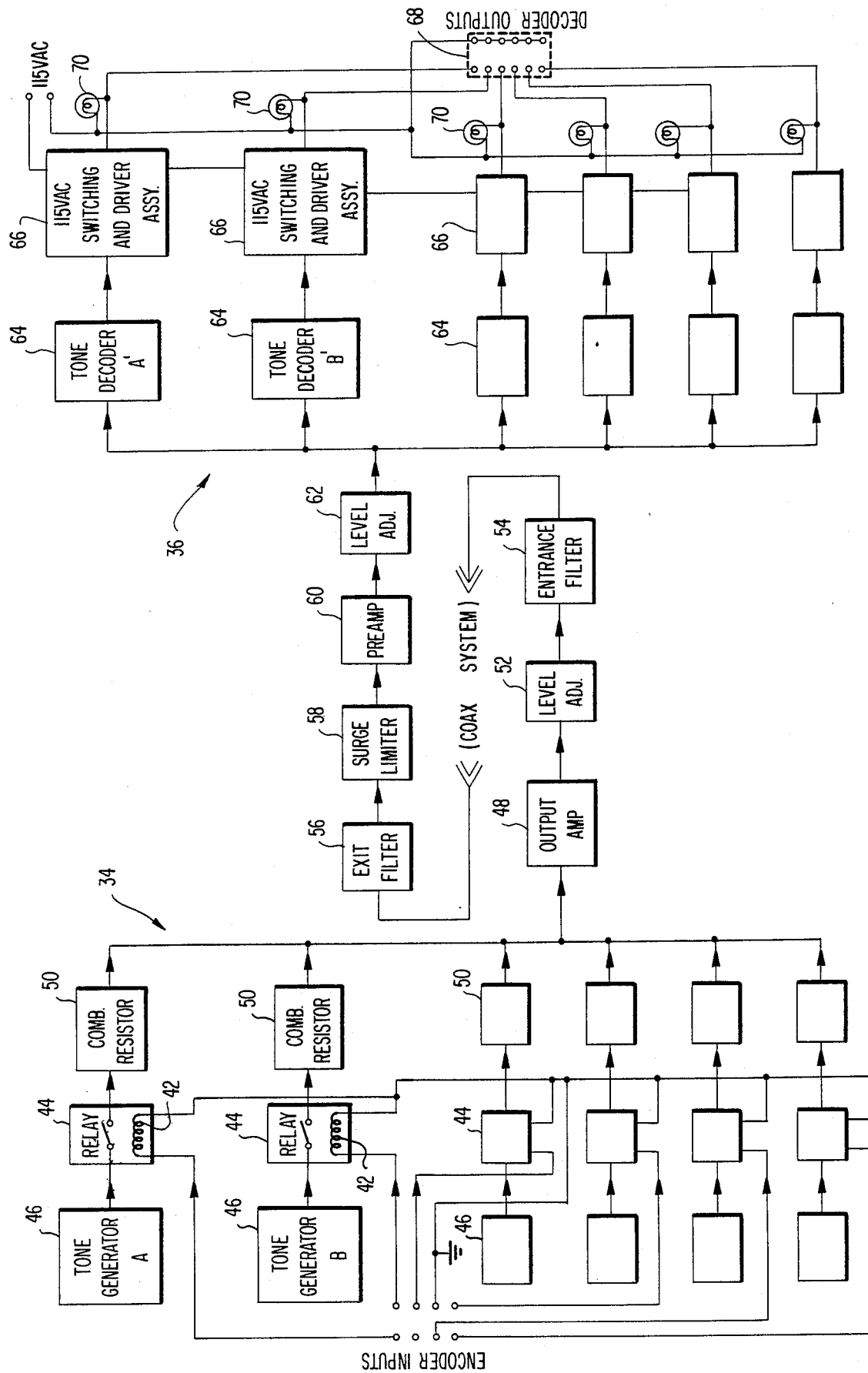
FIG. 3 shows a more detailed block diagram of a communications system according to the present invention for implementing the remote control of a non-duplication switcher.

Turning now to FIG. 3, the encoder 34 may, for example, have six inputs, each one being coupled to ground through a coil 42 of a 24 volt d.c. relay 44. When a selected coil 42 is energized by an appropriate input signal its associated relay switch is closed which couples a tone generator 46 to a class A output amplifier 48 through a combining resistor 50. Each tone generator 46 produces an individual signal within the prescribed upstream frequency band from 100 – 200KHz.

The encoder inputs are plug connected via a multi-wire cable to the outputs of the Jerrold Program Commander model PC-6 or similar device, not shown, programmed to apply a 24 volt d.c. signal to a selected one or ones of its output terminals at a desired time.

The output amplifier 48 is a complimentary pair driver stage capable of delivering sufficient power into the low impedance load that is exhibited at frequencies of 10 – 300KHz by a typical CATV coaxial cable system. The amplifier output level is set by a level adjuster 52 and passed through an entrance filter 54. The latter provides about 63 db of isolation between the 60Hz power signal in the coaxial system and the amplifier output signal. The amplified, level adjusted, and filtered tone generator signals are coupled to the coaxial system through a power inserter 20 as shown in FIG. 2, and travel through the system over the 60Hz power path to the decoder 36 at the head end site, where they are received and recovered.

The decoder 36 comprises, in sequence, an exit filter 56, a surge limiter 58, a preamplifier 60, a level adjuster 62, tone decoders 64, 115 volt a.c. switching and driver assemblies 66, and an output terminal block 68. Only six tone generators and six tone decoders are shown in FIG. 3 due to the availability of only six outputs on commercially available non-duplication switchers. More tone channels may easily be used, if desired, with the total number being limited only by the available bandwidth of 10 – 300KHz.

The exit filter 56 isolates the 60Hz power signal from the communications signal by attenuating a 60Hz sinusoidal waveform about 200 db. The attenuation of a 60HZ square wave applied to the filter is still about 66 db, thus ensuring sufficient signal separation even if the 60Hz signal is highly distorted. Any 60Hz spikes or surges are clipped by the surge limiter 58 to about 0.7 volt, thus protecting the input of the preamplifier 60.

The preamplifier 60 is preferably an operational amplifier externally compensated to attenuate high frequency signals, and provides approximately 40 db of gain for the desired communications signals. The level adjuster is set to provide a signal amplitude of approximately 0.8 volt to the tone decoders 64.

Each tone decoder 64 is preferably a phase locked loop integrated circuit set to free run or oscillate at the frequency of its corresponding tone generator 46 in the encoder. Thus, the uppermost tone decoder marked A' in FIG. 3 responds to the uppermost tone generator marked A, decoder B' responds to generator B, and so on. Each decoder has a capture range, or bandwidth, set by an external capacitor, and an output that is normally at a logic "1" level. When a tone decoder locks onto a signal in its capture range its output switches to a logic "0" which triggers the associated switching and driver assembly 66. The latter in turn applies 115 volt a.c. across the associated decoder outputs in the terminal block 68, which energizes the Jerrold model IF switch or similar coaxial relay, not shown, which switches and thereby applies a different video signal to a particular TV channel of the coaxial system. Indicator lamps 70 may be provided, if desired, to visually signal the triggering of a selected decoder channel.

Figure 4:
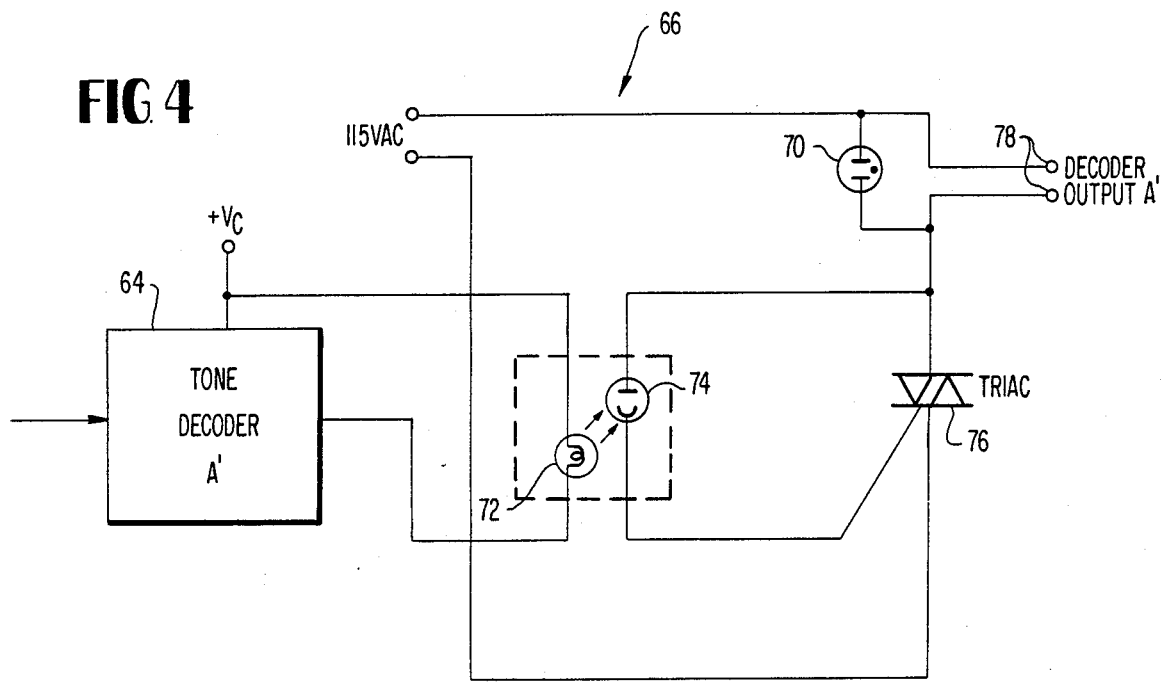
FIG. 4 shows a schematic circuit diagram of one of the switching and driver assemblies shown in FIG. 3.

The details of a suitable switching and driver assembly 66 are shown in FIG. 4. When decoder 64 in the A – A' channel senses an input in its capture range from the corresponding tone generator 46 in the encoder, its output drops from the normal logic "1" level, which is equal to +Vc, to a logic "0" level. This applies a potential of +Vc across the lamp 72 to illuminate it, and the light therefrom reduces the resistance of the photocell 74 by a sufficient amount to apply a triggering and holding current to the gate of the Triac 76. The latter then becomes conductive, which applies the 115 volt a.c. signal across the decoder output terminals 78 of channel A – A'.

Figure 5:
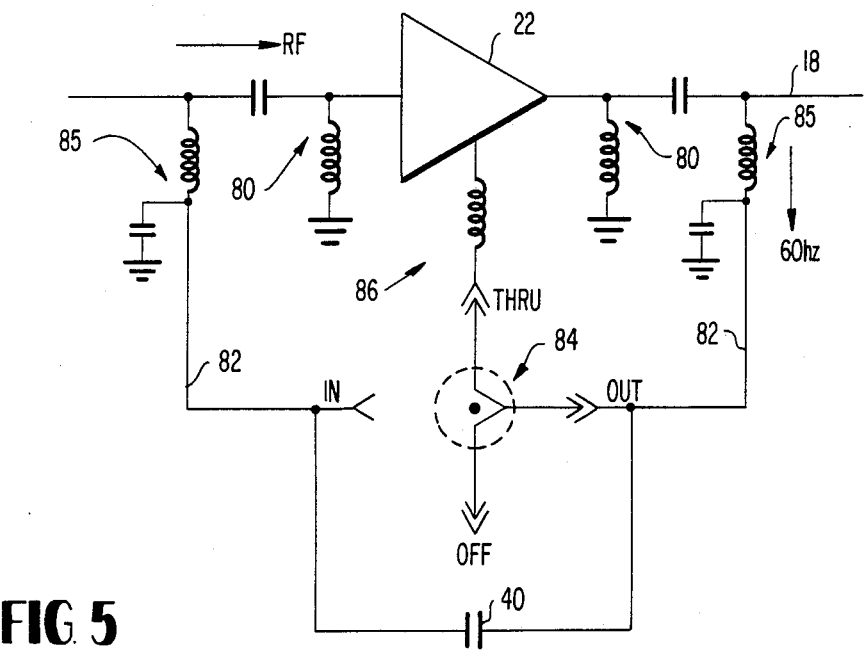
FIG. 5 shows a schematic circuit diagram of a 60Hz power coupling switch for an amplifier shunted by a capacitor to complete the communications signal path.

FIG. 5 illustrates the manner in which 60Hz power is coupled to an active component in a CATV system, such as a trunk amplifier 22. The 60Hz signal in the cable 18 is blocked from the amplifier at both the input and output sides by suitable tank circuits or filters 80, and shunted through a by-pass line 82 which includes a four position coupling switch 84 connected in series. The by-pass line 82 also includes choke coils and capacitors 85 at both ends to block the high frequency r.f. signals while passing the 60Hz power signal and the 10 – 300KHz communications signal. When the switch 84 is set in the OUT position as shown, as when the amplifier 22 is at the beginning of a powering run, 60Hz power is taken from the output side. Conversely, if the amplifier is at the end of a powering run the switch 84 would be set in the IN position to derive 60Hz power from the input side. If the amplifier is intermediate the ends of a powering run the switch 84 would be set to the THRU position to tap off power from the amplifier and pass it through to the next component in the chain.

When the switch 84 is in either the IN or OUT positions the 60Hz path, which the communications signals follows, is broken, and it therefore becomes necessary to connect a 1.0 µf capacitor 40 across the IN and OUT terminals of the switch to bridge the gap and complete the communications path. At the same time, the power coupling switch of the next adjacent component, the next upstream component for the case shown in FIG. 5, must be set to the THRU position to eliminate any dead legs in the 60 Hz path. The power coupling switch of the next upstream component, which would be at the end of the preceding powering run, would otherwise normally be set to the IN position.

With certain types of amplifiers, there may be an insufficient amount of isolation presented to the 10 – 300KHz band by the input to the amplifier power supply. In such cases it is necessary to incorporate a choke coil 86 connected in series between the THRU terminal of the coupling switch 84 and the power supply input terminal of the amplifier 22 in order to block the 10 – 300KHz communications signal from the amplifier. Such a choke coil is shown in FIG. 5, and preferably has an inductance of approximately 250µh.

Figure 6:
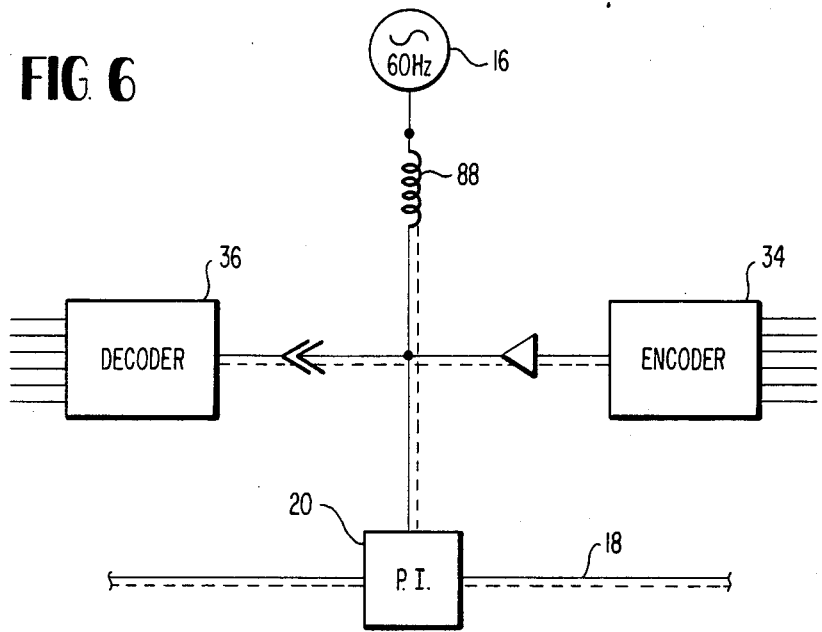
FIG. 6 shows a simplified schematic diagram of a power supply source coupled into the system through a low frequency signal isolation choke.

When using a relatively low frequency communications signal, in the range from 10 – 50KHz, it is also preferable to provide additional power supply isolation. This may also take the form of a choke coil 88 of approximately 250µh connected in series between each power supply source 16 and its associated power inserter 20, as shown in FIG. 6. If an encoder or decoder is present, it would be coupled to the 60Hz power supply line between the choke coil and the power inserter.

Although the specific disclosed use of the invention relates to the remote programming of a non-duplication switcher, it is to be understood that the invention is by no means limited thereto but is broadly applicable to implementing general communications between any two or more points linked by a CATV coaxial cable system over a frequency band of 10 – 300KHz. Likewise, the communications signals are not limited to pure tone signals but may take any appropriate form within the prescribed frequency band, including both analog and digital signals.

The potential use for this invention include alarm and emergency signaling systems between subscribers and a central monitoring facility, a retail shopping service wherein orders are communicated by the invention to a central ordering and delivery facility, national defense communications, etc. Furthermore, it is to be understood that the principals of this invention apply with equal facility to CATV systems energized by 50Hz power supplies, as is used in many foreign countries. Additionally, although only three communications signal input - output stations have been shown in FIG. 2, any number of such stations could be employed provided that sufficient separation is maintained between their assigned communications signal frequencies within the indicated band. If digital coding is employed with each station being assigned a discrete address, then any number of stations can be accommodated on a time sharing basis.

What is claimed is:

1. A method for implementing ancillary communications between two or more points linked by a CATV coaxial cable system including a transmitting antenna site, a plurality of remote subscriber sites, coaxial cable means linking the transmitting/antenna site to each of the subscriber sites, a plurality of active and passive circuit components connected in the cable means to implement r.f. signal amplification, signal branching, etc., and at least one alternating current power supply source coupled to the cable means to supply electrical operating power to the active circuit components, said CATV coaxial cable system including at least one input station and at least one output station remotely located from one another at respective ones of said points, said method utilizing a frequency window of 10–300 KHz in said CATV coaxial cable system and comprising the steps of:

a. generating a communications signal in the frequency band from 10–300 KHz,
 b. coupling the communications signal to the coaxial cable means at said input station, said communications signal being bi-directionally propagated over the path followed by the power supply signal and by-passing those circuit components which implement r.f. signal amplification, and
 c. receiving the communications signal at said output station on the coaxial cable means.

2. A method as defined in claim 1 further comprising capacitively coupling the communications signal across any gaps that may be present in the power supply signal path within the coaxial cable system.

3. A method as defined in claim 1 wherein there are a plurality of input stations and output stations and communications signals coupled to the coaxial cable means at the input stations are propagated in both the upstream and downstream directions, the upstream direction being toward the transmitting/antenna site and the downstream direction being away from the transmitting/antenna site, and further comprising generating communications signal for upstream propagation and reception in a first portion of the frequency band from 10–300 KHz and generating communications signal for downstream propagation and reception and a second, different portion of said frequency band, said first and second portions constituting said frequency band.

4. A method for implementing the remote control of the relay switches of a non-duplication switcher in a CATV coaxial cable system including a transmitting/antenna site, at which the relay switches are located, a plurality of remote subscriber sites, coaxial cable means linking the transmitting/antenna site to each of the subscriber sites, a plurality of active and passive circuit components connected in the cable means to implement r.f. signal amplification, signal branching, etc., and at least one alternating current power supply source coupled to the cable means to supply electrical operating power to the active circuit components, said CATV coaxial cable system including at least one output station located at said transmitting/antenna site and at least one input station remotely located from said transmitting/antenna site, said method utilizing a frequency window of 10–300 KHz in said CATV coaxial system and comprising the steps of:

a. selectively generating control signals for the relay switches in the frequency band from 10–300 KHz at said input station remote from the transmitting/antenna site,
 b. coupling the control signals to the coaxial cable means at the remote input station, said control signals being propagated to the transmitting/antenna site over the path followed by the power supply signal and by-passing those circuit components which implement r.f. signal amplification,
 c. receiving the control signals at the transmitting/antenna site, and
 d. controlling the relay switches in response to the received control signals.

5. A method as defined in claim 4 further comprising capacitively coupling the control signal across any gaps that may be present in the power supply signal path within the coaxial cable system.

6. A method as defined in claim 5 wherein the control signals comprise a plurality of discrete tone signals, the generating step comprises generating selected tone signals in accordance with a predetermined time program, and the receiving step comprises detecting the presence of said tone signals in the propagation path of the power supply signal.

7. An apparatus for implementing ancillary communications between two or more points linked by a CATV coaxial cable system including a transmitting/antenna site, a plurality of remote subscriber sites, coaxial cable means linking the transmitting/antenna site to each of the subscriber sites, a plurality of active and passive circuit components connected in the cable means to implement r.f. signal amplification, signal branching, etc., and at least one alternating current power supply source coupled to the cable means to supply electrical operating power to the active circuit components, said CATV coaxial cable system including at least one input station and at least one output station remotely located from one another at respective ones of said points, said ancillary communication between said two or more points utilizing a frequency window of 10–300 KHz in said CATV coaxial system and comprising:

a. means for generating a communications signal in the frequency band from 10–300 KHz,
 b. means for coupling the communications signal to the coaxial cable means at said input station, said communications signal being bi-directionally propagated over the path followed by the power supply signal and by-passing those circuit components which implement r.f. signal amplification, and
 c. means for receiving the communications signal at said output station on the coaxial cable means.

8. An apparatus as defined in claim 7 further comprising capacitor means connected across any gaps that may be present in the power supply signal path within the coaxial cable system to thereby complete the propagation path for the communications signal.

9. An apparatus for implementing the remote control of the relay switches of the non-duplication switcher in a CATV coaxial cable system including a transmitting/antenna sight, at which the relay switches are located, a plurality of remote subscriber sites, coaxial cable means linking the transmitting/antenna site to each of the subscriber sites, a plurality of active and passive circuit components connected in the cable means to implement r.f. signal amplification, signal branching, etc., and at least one alternating current power supply source coupled to the cable means to supply electrical operating power to the active circuit components, said CATV coaxial cable system including at least one output station located at said transmitting/antenna site and at least one input station remote from said transmitting/antenna site said apparatus for implementing the remote control of said relay switches utilizing a frequency window of 10–300 KHz in said CATV coaxial system and comprising:

a. means for selectively generating control signals for said relay switches in the frequency band from 10–300 KHz at said input station remote from the transmitting/antenna site, b. means for coupling the control signal to the coaxial cable means at said remote input station, said control signals being propagated to the transmitting/antenna site over the path followed by the power supply signal and by-passing those circuit components which implement the r.f. signal amplification, c. means for receiving the control signals at said output station at the transmitting/antenna site, and d. means connected to said receiving means for applying control signals to said relay switches in response to the received control signals.

10. An apparatus as defined in claim 9 wherein the selective generating means comprises a plurality of discrete tone signal generators, each having a different frequency within the band from 10 – 300KHz, and means for coupling the outputs of selected tone signal generators to the coaxial cable means in accordance with a predetermined time program, and the receiving means comprises a like plurality of tone decoders each responsive to a particular tone signal from one of the tone signal generators.

* * * * *